US007792875B2

(12) United States Patent
McKeough et al.

(10) Patent No.: US 7,792,875 B2
(45) Date of Patent: *Sep. 7, 2010

(54) METHOD FOR REPRESENTING AND RECREATING OBJECT DEPENDENCIES FROM ONE DATABASE SYSTEM TO ANOTHER

(75) Inventors: Sean W. McKeough, Markham (CA); David Sciaraffa, Markham (CA)

(73) Assignee: International Business Machines Corporation, Armonk, NY (US)

( * ) Notice: Subject to any disclaimer, the term of this patent is extended or adjusted under 35 U.S.C. 154(b) by 266 days.

This patent is subject to a terminal disclaimer.

(21) Appl. No.: 11/393,422

(22) Filed: Mar. 30, 2006

(65) Prior Publication Data
US 2007/0239763 A1 Oct. 11, 2007

(51) Int. Cl.
G06F 17/30 (2006.01)
(52) U.S. Cl. ..................................................... 707/803
(58) Field of Classification Search ....................... None
See application file for complete search history.

(56) References Cited

U.S. PATENT DOCUMENTS

| | | | | |
|---|---|---|---|---|
| 5,806,066 A | * | 9/1998 | Golshani et al. | 707/100 |
| 5,948,057 A | * | 9/1999 | Berger et al. | 709/205 |
| 6,243,709 B1 | * | 6/2001 | Tung | 707/103 R |
| 6,341,287 B1 | * | 1/2002 | Sziklai et al. | 707/102 |
| 7,236,967 B2 | * | 6/2007 | Hogan | 707/1 |
| 7,254,588 B2 | * | 8/2007 | Sung et al. | 707/104.1 |
| 2001/0047372 A1 | * | 11/2001 | Gorelik et al. | 707/514 |
| 2003/0217027 A1 | * | 11/2003 | Farber et al. | 707/1 |
| 2004/0243613 A1 | * | 12/2004 | Pourheidari | 707/102 |
| 2005/0004918 A1 | * | 1/2005 | Platt | 707/100 |
| 2006/0004828 A1 | * | 1/2006 | Rajamani et al. | 707/102 |
| 2006/0036637 A1 | * | 2/2006 | Sayal et al. | 707/102 |
| 2006/0101452 A1 | * | 5/2006 | Mak | 717/168 |
| 2006/0149769 A1 | * | 7/2006 | McCormack et al. | 707/101 |
| 2006/0167920 A1 | * | 7/2006 | Hankinson | 707/102 |
| 2006/0271557 A1 | * | 11/2006 | Harward et al. | 707/10 |
| 2007/0055693 A1 | * | 3/2007 | Galbraith et al. | 707/103 R |

* cited by examiner

*Primary Examiner*—Neveen Abel Jalil
*Assistant Examiner*—Bai D Vu
(74) *Attorney, Agent, or Firm*—Sawyer Law Group, P.C.

(57) ABSTRACT

A method for recreating a plurality of database dependencies of objects from one database to another is disclosed. The method comprises categorizing the dependencies based upon at least one base object and formalizing the relationships of the dependencies based upon the categorization. The method includes determining the order of recreating the objects based upon the formalizing of the relationships of the dependencies. In a preferred embodiment, the method builds a Dependency Management Table (DMT) that describes the relationship of each object to a base-table. The DMT includes an entry for every object-to-object relationship, including the category of the relationship, and the nesting-level of the dependency from the base-table. Using this information, objects can be recreated in an order which ensures correct management of dependencies.

18 Claims, 14 Drawing Sheets

| OBJNAME | REF_OBJNAME | REF_OBJSCHEMA | REF_TYPE | NESTLEVEL | CATEGORY |
|---|---|---|---|---|---|
| NULL | NULL | T1 | T | 0 | A |
| NULL | NULL | T2 | T | 0 | A |
| NULL | NULL | T3 | T | 0 | A |
| T1 | T | U1 | U | 1 | A |
| U1 | U | U2 | U | 2 | A |
| T3 | T | F1 | F | 1 | A |
| F1 | F | T2 | T | 2 | A |
| F1 | F | F3 | F | 2 | A |
| F3 | F | V2 | V | 3 | A |
| V2 | V | T2 | T | 4 | A |
| T1 | T | NULL | NULL | 0 | B |
| T2 | T | NULL | NULL | 0 | B |
| T3 | S | NULL | NULL | 0 | B |
| V1 | V | T1 | T | 1 | B |
| V2 | V | T2 | T | 1 | B |
| F1 | F | T2 | T | 1 | B |
| F3 | F | V2 | V | 2 | B |
| V3 | V | V2 | V | 2 | B |
| F1 | F | V3 | V | 3 | B |
| T3 | T | F1 | F | 4 | B |
| V3 | V | F2 | F | 1 | C |
| F2 | F | U1 | U | 2 | C |
| U1 | F | U2 | U | 3 | C |

Figure 13

METHOD FOR REPRESENTING AND RECREATING OBJECT DEPENDENCIES FROM ONE DATABASE SYSTEM TO ANOTHER

FIELD OF THE INVENTION

The present invention relates generally to a database system and more specifically to recreating objects with interdependencies from one database system to another.

BACKGROUND OF THE INVENTION

Database systems are utilized for a variety of environments. For example, a database system such as the IBM RDBMS system is utilized to track certain information. It is desirable to be able to translate this information to information with another database. Accordingly, it is important to be able to recreate database management objects (core objects such as tables, as well as business objects such as views) from one database system to another in an order that satisfies dependencies among these objects. For instance, in order to recreate a table, all the objects that this table depends on must first be recreated, but all objects that these dependent-objects depend on must be recreated first, and so forth.

Accordingly, there is a need to take a set of tables as well as business objects such as views from one database and recreate them (either into a different database, or into the same database). Therefore, what is needed is a method for recreating database objects from one database system to another while managing the dependencies between these objects, thereby accomplishing the above-mentioned functions. The method should be adaptable, cost effective and easily implemented on a database system. The present invention addresses such a need.

SUMMARY OF THE INVENTION

A method for recreating a plurality of database dependencies of objects from one database to another is disclosed. The method comprises categorizing the dependencies based upon at least one base object and formalizing the relationships of the dependencies based upon the categorization. The method includes determining the order of recreating the objects based upon the formalizing of the relationships of the dependencies.

In a preferred embodiment, the method builds a Dependency Management Table (DMT) that describes the relationship of each object to a base-table. The DMT includes an entry for every object-to-object relationship, including the category of the relationship, and the nesting-level of the dependency from the base-table. Using this information, objects can be recreated in an order which ensures correct management of dependencies.

BRIEF DESCRIPTION OF THE DRAWINGS

FIG. 13 illustrates the layout of a Dependency Management Table derived from the above identified graphs.

DETAILED DESCRIPTION

The present invention relates generally to a database system and more specifically to recreating objects with interdependencies from one database system to another. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
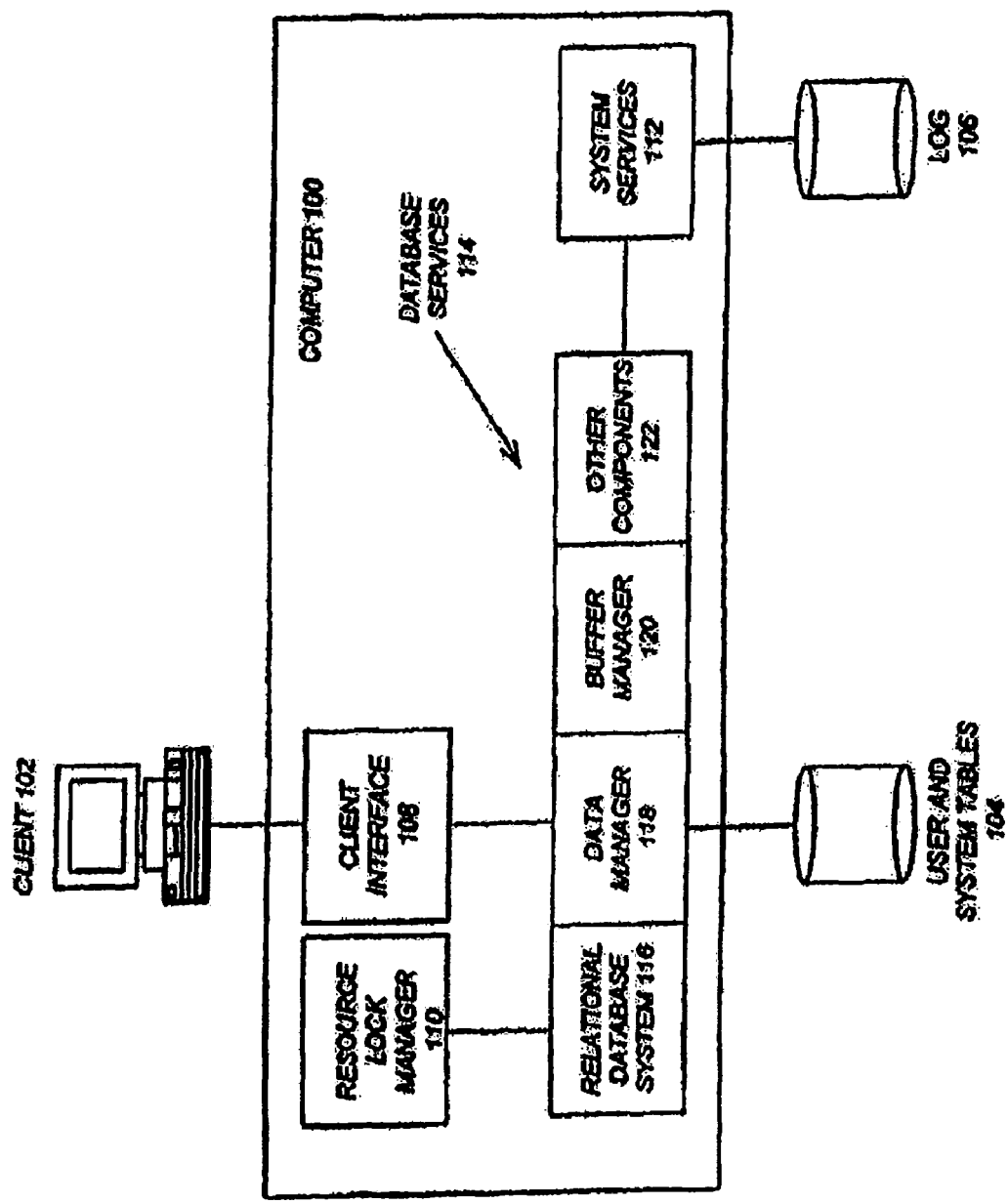
FIG. 1 illustrates an exemplary hardware and software environment that could be used with the preferred embodiment of the present invention.

FIG. 1 illustrates an exemplary hardware and software environment that could be used with the preferred embodiment of the present invention. In the exemplary environment, a server computer 100 is connected to one or more client computers 102 or terminals. The server computer 100 executes a relational database management system (RDBMS) that manages user and system tables 104 and includes a system log 106. In the preferred embodiment of the present invention, the RDBMS comprises the DatBase 2 (DB2®) product offered by IBM® Corporation, although those skilled in the art will recognize that the present invention has application to any RDBMS. The client computers 102 interface to the RDBMS via a client interface component 108.

As illustrated in FIG. 1, the RDBMS includes three major components: the Resource Lock Manager (RLM) 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS is the Database Services module 114. The Database Services module 114 contains several submodules, including a Relational Database System (RDS) 116, Data Manager 118, Buffer Manager 120, and other components 122 such as an SQL compiler/interpreter. These submodules support the functions of the SQL language, i.e., definition, access control, retrieval, and update.

Generally, the RDBMS comprises logic and/or data that is embodied in or retrievable from a device, medium, or carrier, e.g., a fixed or removable data storage device, a remote driver coupled to the computer by a data communications device, etc. Moreover, this logic and/or data, when read, executed, and/or interpreted by the computer 100, causes the computer 100 to perform the steps necessary to implement and/or use the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and ethernet cards are just a few of the currently available types of network adapters.

Of course, those skilled in the art will recognize many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

A method in accordance with the present invention provides a mechanism to represent object dependencies, and then allows for the objects to be recreated in the correct order. This mechanism involves describing the relationship of each object to a base-table. This description include an entry for every object-to-object relationship, including the category of the relationship, and the nesting-level of the dependency from the base-table. Using this information, objects can be recreated in an order which ensures correct management of dependencies.

To describe the features of the present invention in more detail refer now to the following description in conjunction with the accompanying Figures.

Figure 2A:
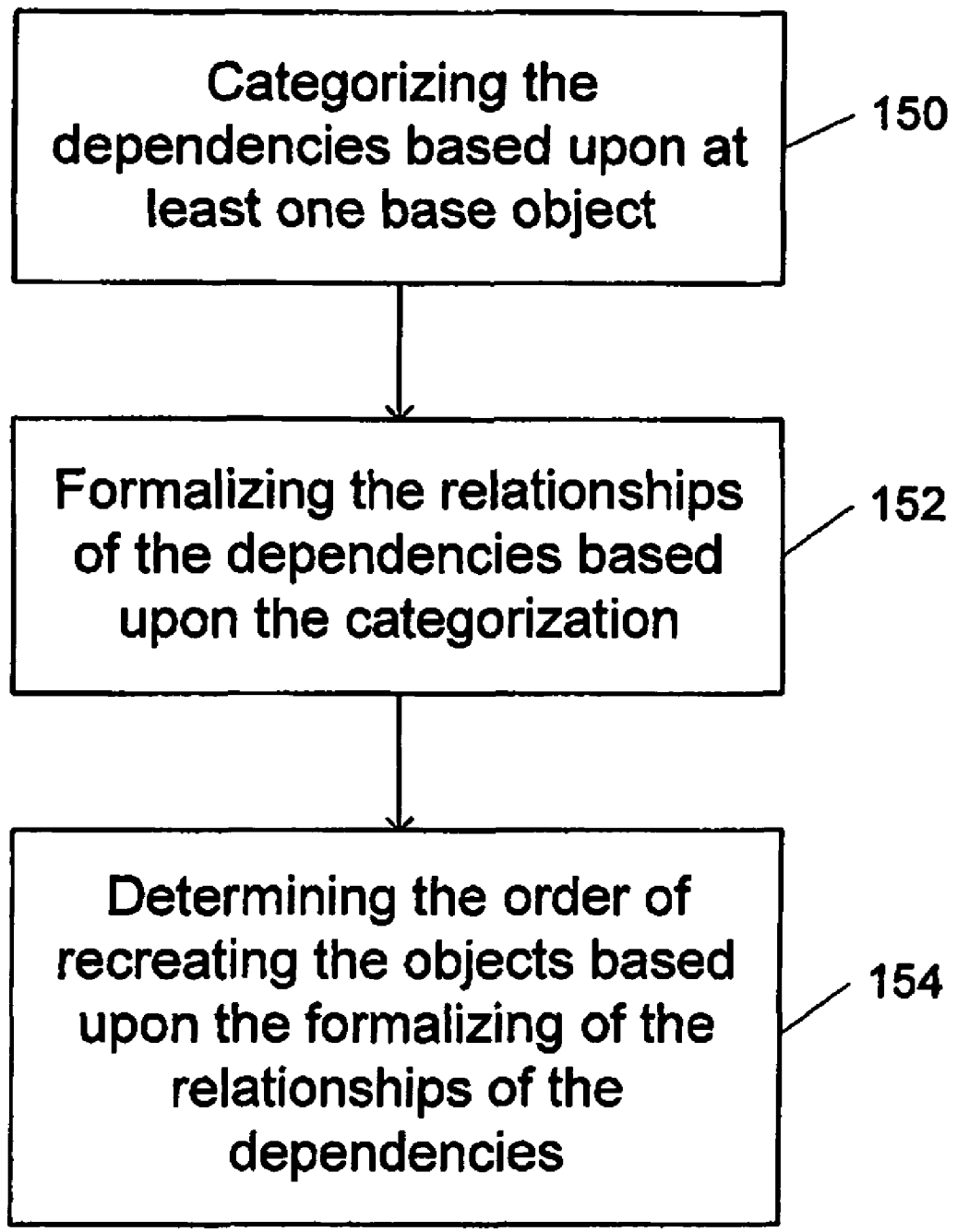
FIG. 2A is a flow chart that is showing generally the process of recreating object dependencies from one database system to another.

FIG. 2A is a flow chart that shows generally the process of recreating object dependencies from one database system to another. First the dependencies are categorized based upon at least one base object, via step 150. Next the relationships of the dependencies are formalized based upon the categorization via step 152. Finally, the order of recreating the objects is determined based upon the formalizing of the relationships of the dependencies via step 154.

Figure 2B:
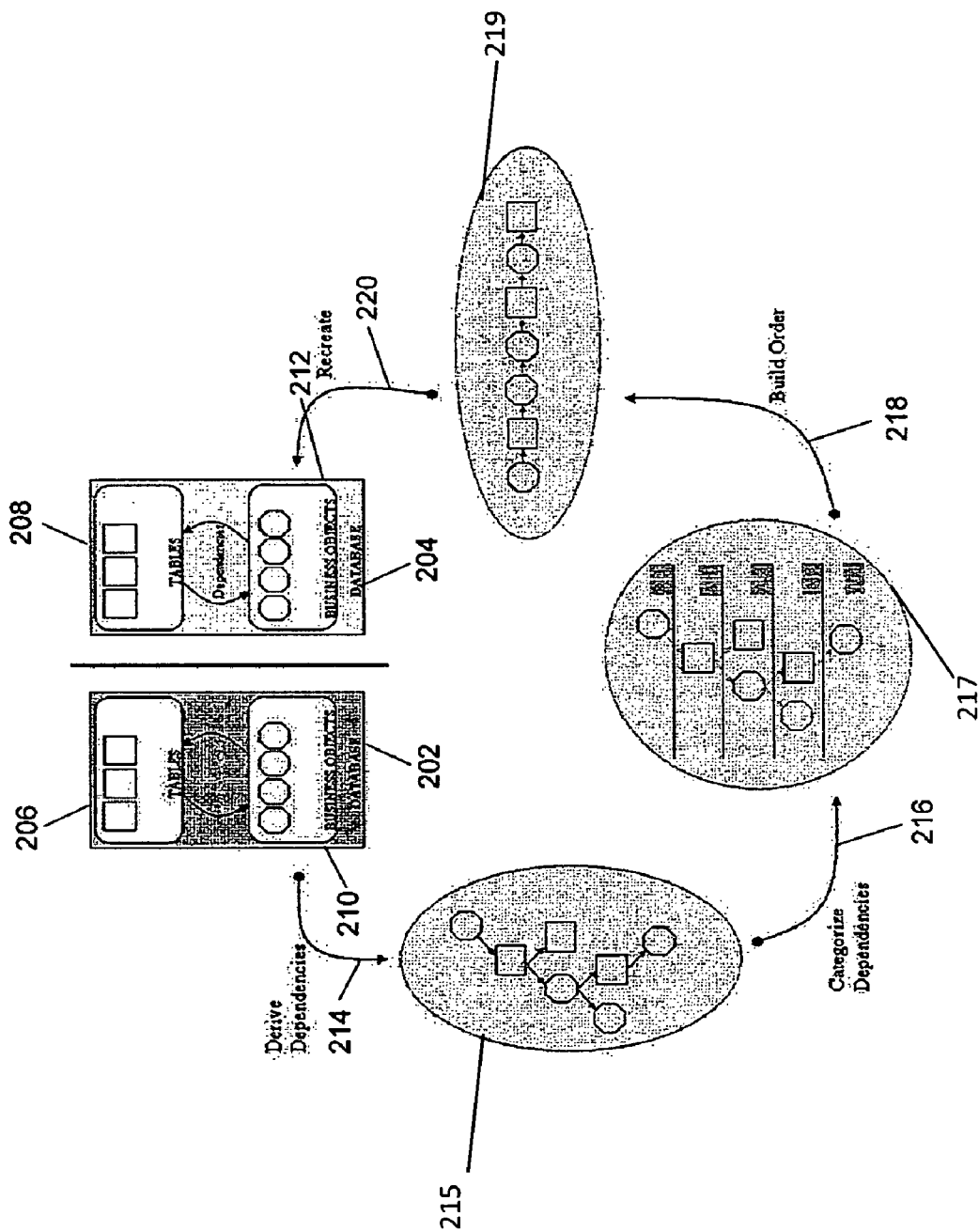
FIG. 2B is a diagram showing generally the process in accordance with the present invention of recreating object dependencies from one database system to another.

FIG. 2B is a diagram showing generally the process in accordance with the present invention of recreating object dependencies from one database system to another. In this embodiment there are two databases 202 and 204. Each of the databases 202,204 includes tables 206, 208 respectively. Each of the databases 202,204 also includes business objects 210,212, respectively. The tables 206,208 have dependencies to each of their respective business objects 210,212. Accordingly, what is desired is to recreate these dependencies from database 202 to database 204. In this embodiment, dependencies are derived (214) from database 202, the derived dependencies are depicted into categories (215), then those dependencies are categorized (216). Thereafter the relationships of those dependencies are related to a build order (217) and are provided (218). Thereafter build order for recreation are set forth (219) and object dependencies are recreated (220) in database 204 based upon the relationships. In order to accomplish this, using the example of core objects such as tables, the following issues need to be addressed:

(1) A table can depend on other objects.

(2) These other objects can depend on other objects, including other base-tables.

(3) In order to recreate the table, all of the dependent objects need to be recreated first. However, since dependencies can exist on many levels and in different forms, a system and method is needed to formally categorize and accrue these dependencies and is also needed to generate the correct order of reply.

(4) Additionally, it is also necessary to recreate all of the objects which depend on the above-mentioned tables.

To describe these features in more detail, refer now to the following description in conjunction with the accompanying Figures. First certain terms will be defined.

Tables

At the simplest level, a database system contains tables (objects which store records of information separated into different columns). Insertion of data into, and querying data out of tables is the fundamental basis for a database system.

Business Objects

Above this, a database system may contain business-objects (some entity that helps a user achieve something). For instance, a User Defined Type (UDT) is a business object that allows a user to define a new column data-type. For example, a customer might create a new UDT as a structure of several basic data-types, using pseudo code like:

CREATE TYPE Person_t AS
(Name VARCHAR(20),
Age INTEGER);

The user can then create a table using this type as a column:

CREATE TABLE tab1
(col1 INTEGER
col2 Person_t);

and query data from this table:
SELECT col1, col2 . . . Name, col2 . . . Age
FROM tab1;

Another type of business object is a VIEW. A view is a 'named specification of a result table'. That is, a view can be declared as a specific query:
CREATE VIEW v1 as select col1, col2 . . . Age from tab1
Then simply use the view in different ways
SELECT+from v1;
INSERT INTO v1 values (1, 28);

A database system will contain many different types of business objects. For the purpose of the disclosure of the invention it is not necessary to identify them in all permutations, but rather a basic principle that needs to be understood is that a base table might depend on business objects (i.e. in the example above, table tab1 depends on UDT Person_t), and likewise a business object might depend on a base table (i.e., in example above, view v1 depends on table tab1).

Also, in a database system, the relationship between objects is recorded (in DB2, the relationship is recorded in the system catalog tables. Various catalog tables can be queried to determine the dependencies for any particular object). Given an object, it can be determined what direct dependencies this object has, and what other objects depend on it.

A method in accordance with the present invention categorizes and accrues dependencies as well as how to use this information to generate the order which guarantee's objects are recreated successfully.

First a plurality of dependency types are categorized, and the method of categorization employed must handle these different classes of dependencies: direct dependencies, nested dependencies, multi-level dependencies and up level/down level dependencies. To describe each of these dependencies in more detail, refer now to the following discussion in conjunction with the accompanying figures.

Direct Dependencies

Figure 3:
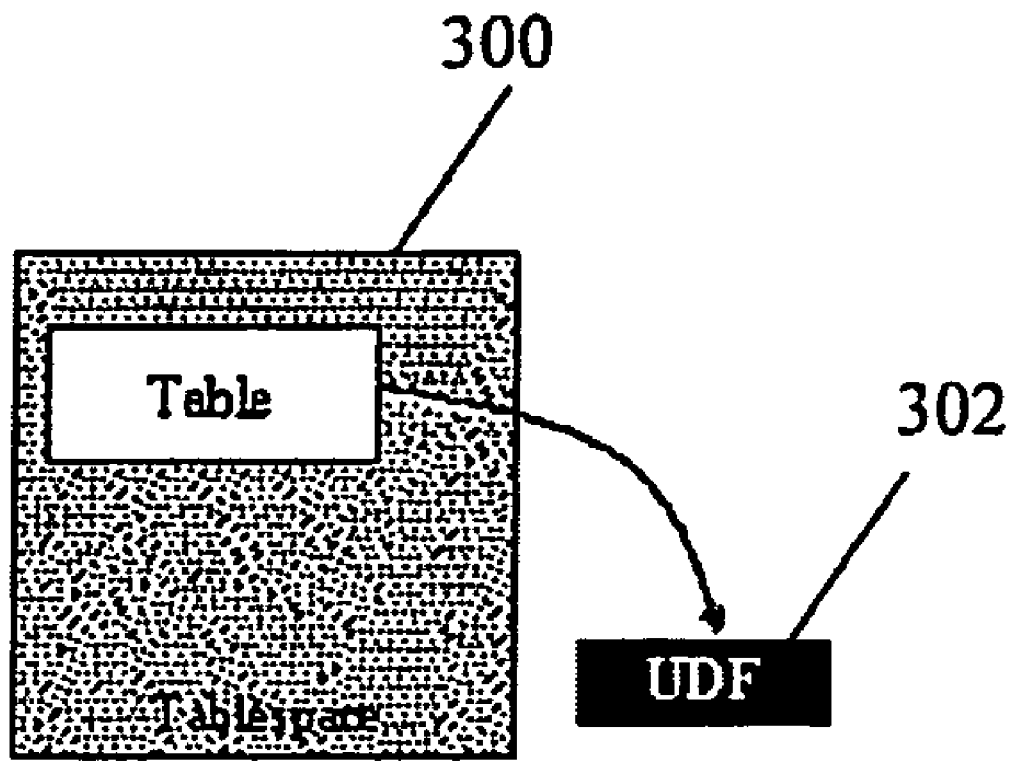
FIG. 3 shows a direct dependency between objects.

FIG. 3 shows a direct dependency between objects. A direct dependency describes a relationship between two objects. In this example, a table 300 contains a generated-column which references a User Defined Function (UDF) 302. Therefore there is a direct dependency between the table 300 and the UDF 302. In order to recreate the table 300, the UDF 302 must be recreated first.

Nested Dependencies

Figure 4:
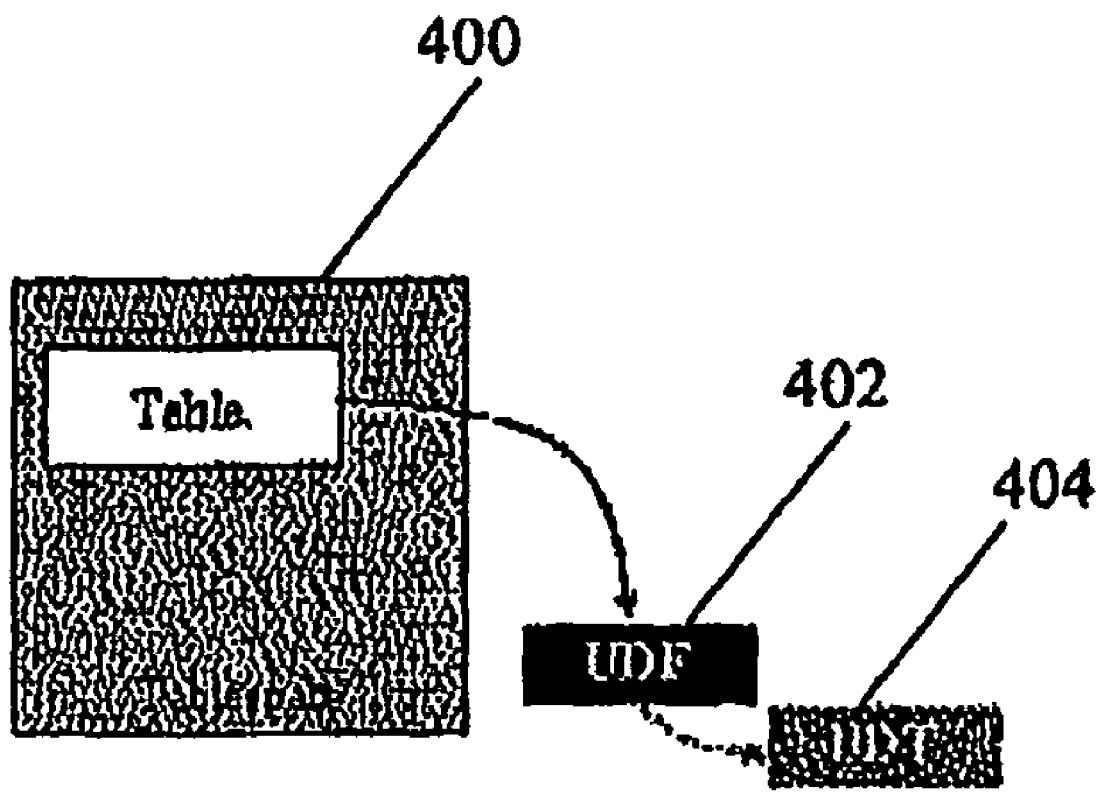
FIG. 4 shows a depiction of a nested dependency between objects.

FIG. 4 shows a depiction of a nested dependency between objects. A nested dependency describes a relationship between nested levels of objects. In this example, a table 400 contains a generated-column which references a User Defined Function (UDF) 402, and this UDF 402 references a User Defined Type (UDT) 404. Therefore there is a direct dependency between the table 400 and UDF 402, a direct dependency between the UDF 402 and UDT 404, and thus a nested dependency between the table 400 and UDT 404 (the level of recursion of this dependency will be referred to as the 'nest-level' value, which in this case is 2). In order to recreate the table 400, the UDT 402 must be recreated first, then the UDF 504, then the table 400.

Multi-level Dependencies

Figure 5:
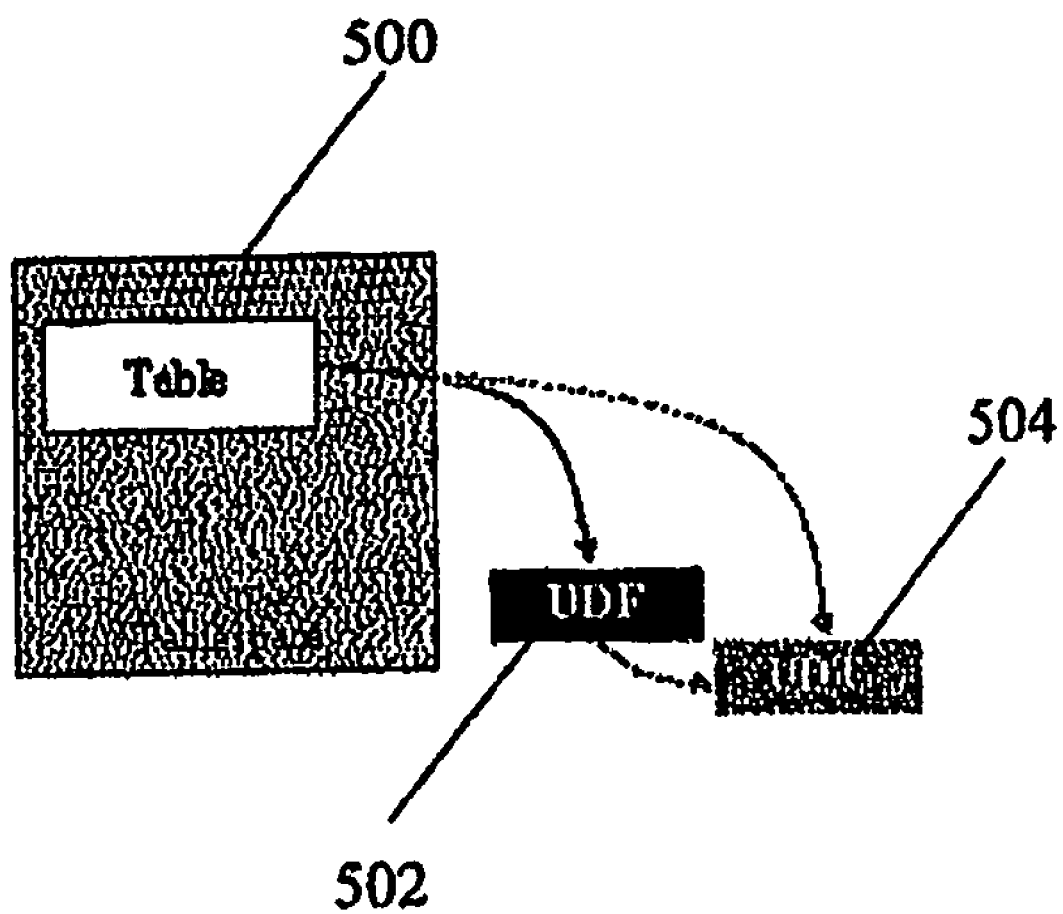
FIG. 5 shows a multi-level dependency between objects.

FIG. 5 shows a multi-level dependency between objects. A multi-level dependency describes a relationship between multiple objects, such that one particular object exists at multiple nest-levels. In this example, a table 500 contains a generated-column which references a User Defined Function (UDF) 502, and this UDF 502 references a User Defined Type (UDT) 504. Now, table 500 also contains another column which references the same UDT 504 directly. There is a direct dependency between the table 500 and the UDT 504, a direct dependency between the table 500 and UDF 502, and a nested dependency between the table 500 and UDT 504 (thus there are two different 'nest-levels' of recursion between the table 500 and the UDT 504). In order to recreate the table 500, the UDT 504 must be recreated first, then the UDF 502, then the table 500.

Up-level/Down-level Dependencies

Figure 6:
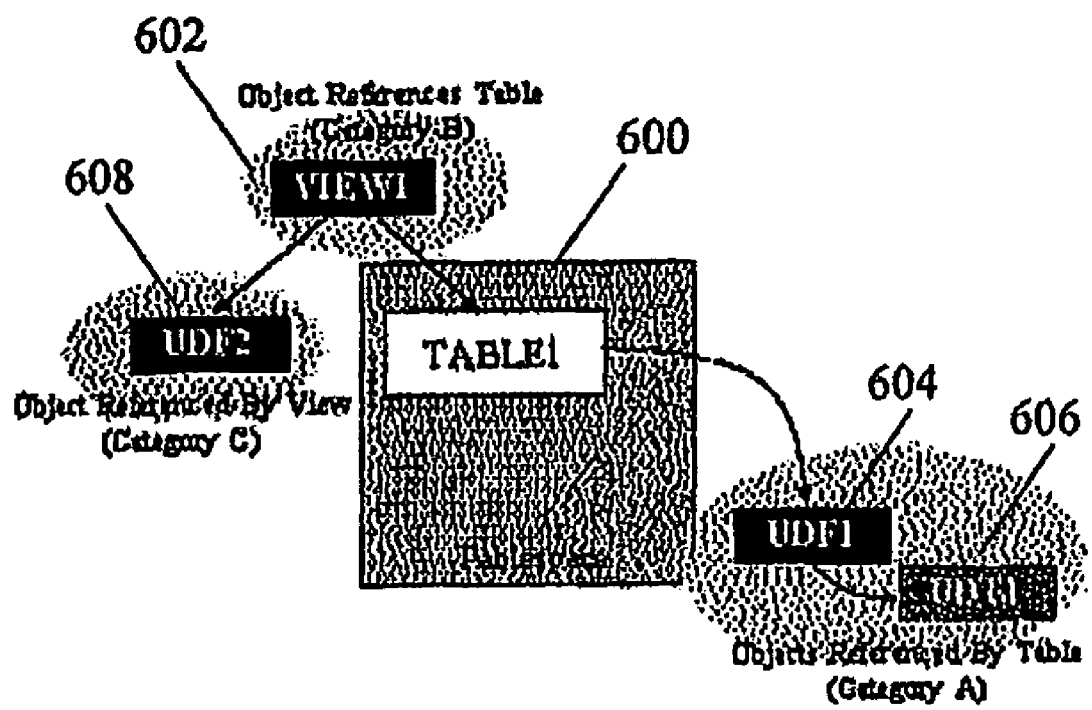
FIG. 6 is a depiction of up-level and down-level dependencies between objects.

FIG. 6 is a depiction of up-level and down-level dependencies between objects. Up-level/Down-level dependencies describe whether a dependency is referenced by a particular object (up-level), or whether a dependency references a particular object (down-level).

Choosing an arbitrary object, a table 600 for example, all down-level dependencies must be recreated in order to recreate the table 600. But, a user might also wish to recreate up-level dependencies, for example a view 602 which references the table. The mechanism/method and system in accordance with the present invention must safely handle both down-level and up-level dependencies. Every up-level dependency can have an additional set of down-level dependencies which would need to be recreated appropriately.

Next, an object-type needs to be chosen that will be the base-object of the dependency relationships. In this embodiment the table object 600 is used as a base-object in this example.

After the dependencies are accrued, the dependencies between base-objects and other objects can be categorized as follows:

(1) Category A dependency: is a down-level dependency from a base-object (objects UDF1 604 and UDT1 606 from base-object table1 600 in FIG. 6).

(2) Category B dependency: is an up-level dependency from a base-object (object view1 608 from base-object table1 600 in FIG. 6).

(3) Category C dependency: is a down-level dependency from a Category B object (object UDF2 610 from Category B object view1 608 in FIG. 6).

Figure 7:
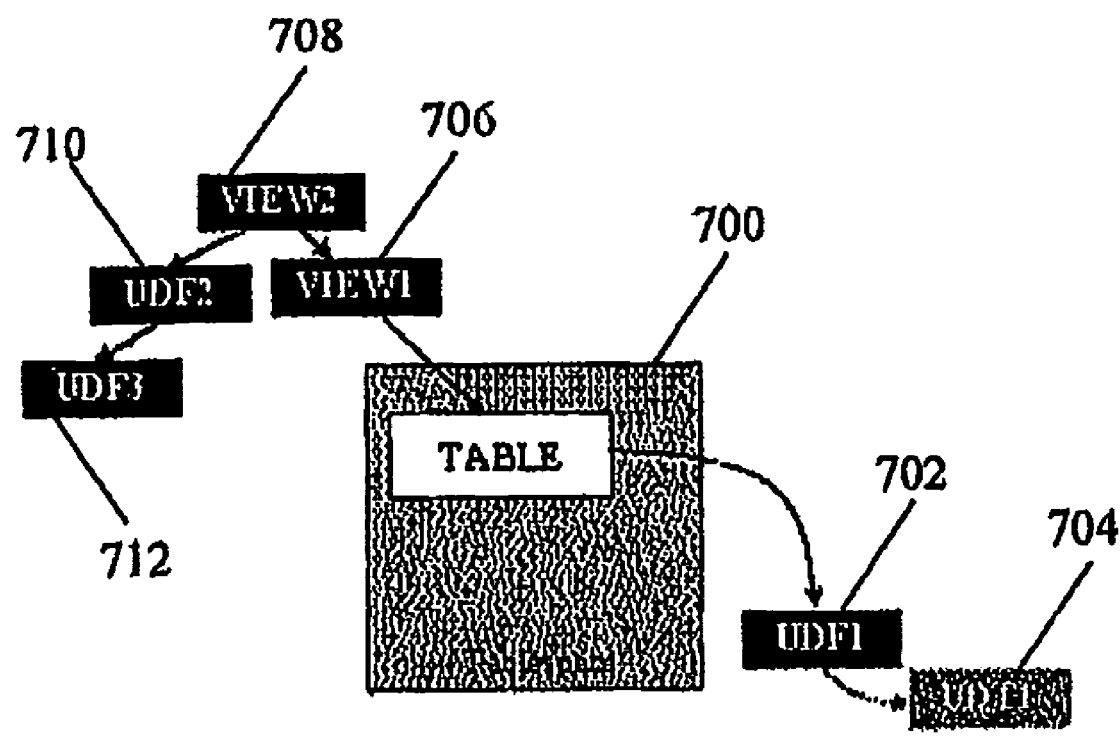
FIG. 7 is a diagram that depicts various nest level recursion of dependencies between objects.

After the dependencies are categorized, next, the 'nest-level' of recursion of the dependency from some base-object are enumerated. FIG. 7 is a diagram that depicts various nest level recursion of dependencies between objects. In this example, the dependency between table 700 and UDF1 702 would have a nest-level of 1, and the dependency between UDF1 702 and UDT1 704 would have a nest-level of 2.

In this embodiment using tables as the base-objects, (1) Every Category A dependent object would have a nestlevel equal to the downward level of recursion from the base-object (TABLE).

(2) Every Category B dependent object would have a nest-level equal to the upward level of recursion from the base-object (table 700).

For example, in FIG. 7 the dependency between view1 706 and table 700 would have a nest-level of 1, the dependency between view2 708 and view1 706 would have a nest-level of 2.

iii) Every Category C object would have a nest-level equal to the level of recursion from the non-base-object.

For example, in FIG. 7 the dependency between view2 708 and UDF2 710 would have a nest-level equal to 1, the dependency between UDF2 710 and UDF3 712 would have a nest-level of 2.

Using these categories and nest-levels, these dependencies can be informally described using a graph-like diagram.

Figure 8:
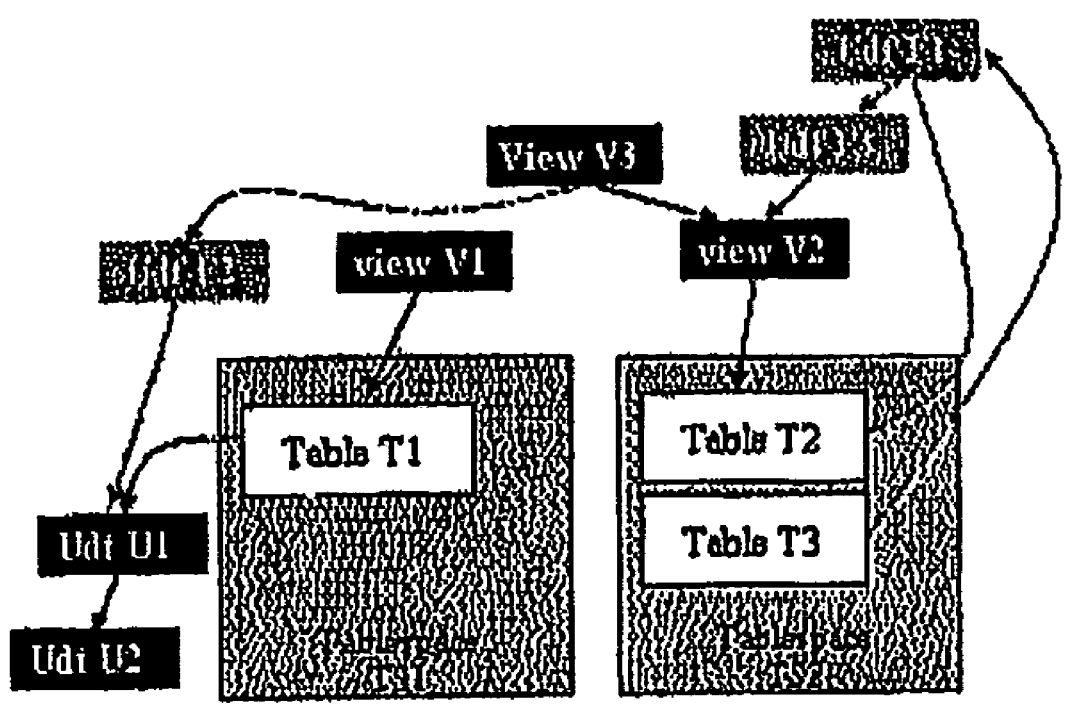
FIG. 8 is a diagram that illustrates various dependencies between objects.
Figure 9:
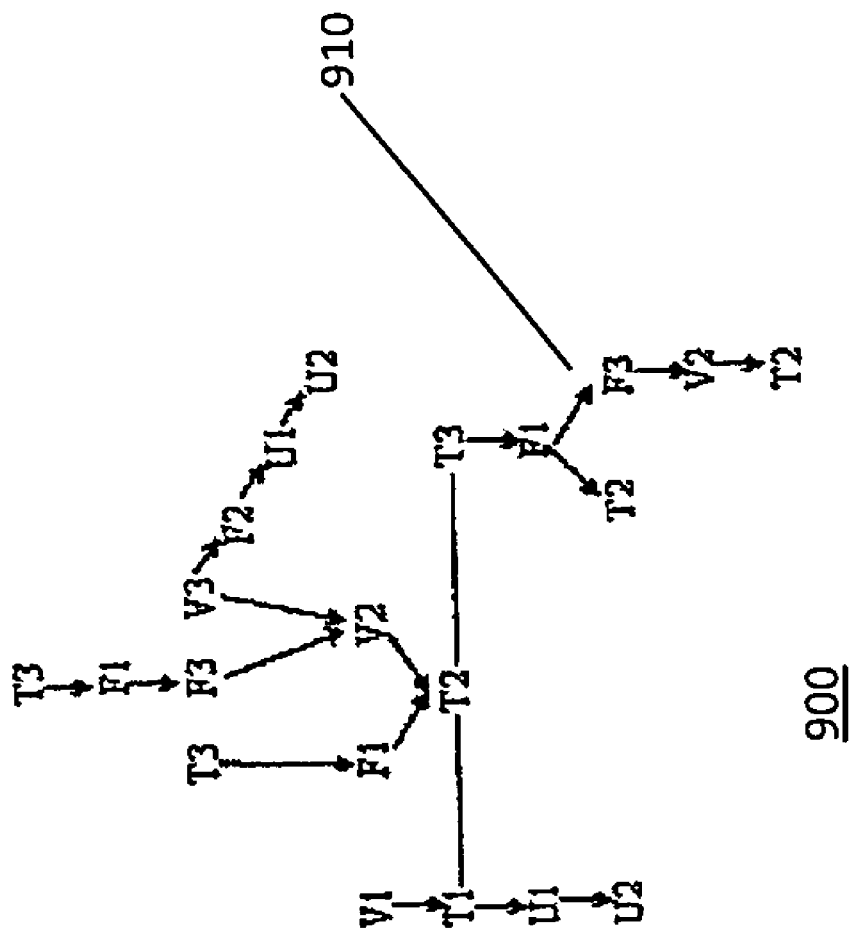
FIG. 9 is a graph-like representation of the relationships shown in FIG. 8.

FIG. 8 is a diagram that illustrates various dependencies between objects. If these dependencies were listed on a chalk board, a diagram (900) depicting these dependencies might look like FIG. 9 which is a graph-like representation of the relationships shown in shown FIG. 8. For example, at 910, the dependency relationship path as between T3 and T2 is set forth.

Proceeding one step further, a graph can be created for each category.

Figure 10:
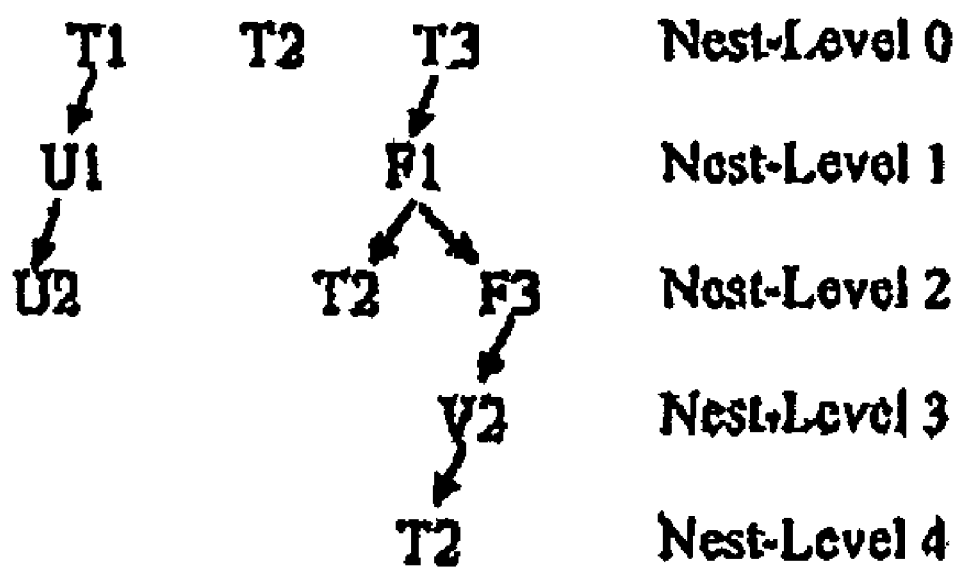
FIG. 10 is a graph illustrating Category A dependencies for the diagram of FIG. 8.

FIG. 10 is a graph illustrating Category A dependencies for the diagram of FIG. 8.

Figure 11:
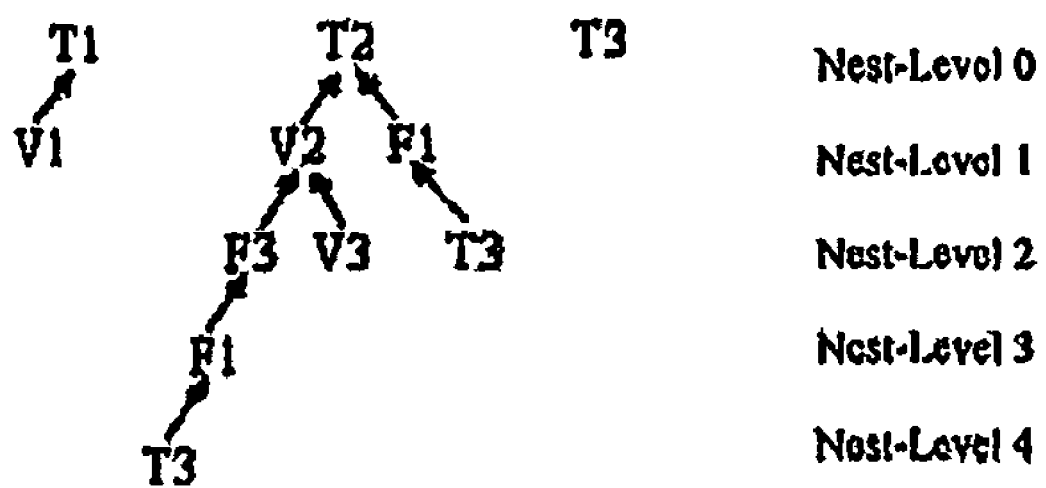
FIG. 11 is a graph illustrating Category B dependencies for the diagram of FIG. 8.

FIG. 11 is a graph illustrating Category B dependencies for the diagram of FIG. 8.

Figure 12:
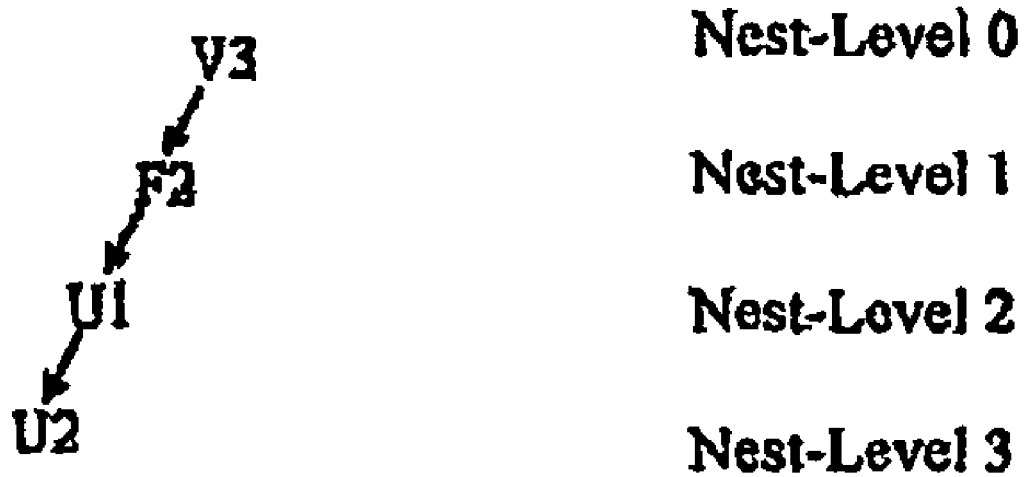
FIG. 12 is a graph illustrating Category C dependencies for the diagram of FIG. 8.

FIG. 12 is a graph illustrating Category C dependencies for the diagram of FIG. 8.

Next, the relationships depicted in the graphs can be formalized by using, in this embodiment, a Dependency Management Table. FIG. 13 illustrates the layout of a Dependency Management Table derived from the above identified graphs.

Referring to FIG. 13, the fourth row in this table indicates "Table T1 references UDF U1, at nestlevel 1, and this is a Category A object".

Finally, the guaranteed order of recreation of objects can be determined from the table. In this embodiment:

When duplicate entries exist for an object (in this example table T2 exists with nestlevel 0, 2, and 4 since it is referenced by multiple objects) then the highest nestlevel takes precedence (the other entries are ignored).

Category A objects first are recreated, from highest nestlevel to lowest, by referencing the 'REF_OBJNAME' column of the Dependency Management Table.

Category C objects are recreated next, from highest nestlevel to lowest, by referencing the 'REF_OBJNAME' column of the Dependency Management Table, avoiding those objects which are already included in the Category A objects recreation.

5. Category B objects are recreated last, from lowest nestlevel to highest, by referencing the 'OBJNAME' column of the Dependency Management Tale, avoiding those objects which are already including in the category A object and the Category C object recreations.

So, given the example above, the correct order would be constructed in the following manner:

->Start with Category A objects from highest nest-level to lowest (letting higher nest-level's take precedence for duplicates, and choosing arbitrarily between equal nest-levels):

T2, V2, F3, U2, F1, U1, T3, T1

->Next add Category C objects from highest nest-level to lowest, (letting higher nest-level's take precedence for duplicates, choosing arbitrarily between equal nest-levels, and avoiding objects already listed (see font)):

T2, V2, F3, U2, F1, U1, T3, T1, F2

=>T2, V2, F3, U2, F1, U1, T3, T1, F2

->Nest add Category B objects from lowest nest-level to highest, using same criteria as above:

T2, V2, F3, U2, F1, U1, T3, T1, F2, V3, V1,

=>T2, V2, F3, U2, F1, U1, T3, T1, F2, V3, V1

A method in accordance with the present invention provides a mechanism to represent object dependencies, and then allows for the objects to be recreated in the correct order. In a preferred embodiment, the method builds a Dependency Management Table (DMT) that describes the relationship of each object to a base-table. The DMT includes an entry for every object-to-object relationship, including the category of the relationship, and the nesting-level of the dependency from the base-table. Using this information, objects can be recreated in an order which ensures correct management of dependencies.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method for recreating a plurality of database dependencies of objects from one database to another database, wherein the computer performs the following functions comprising:

categorizing the dependencies based upon at least one base object, wherein dependencies include all dependency classes of direct dependencies and nested dependencies, wherein a nested dependency describes a relationship between nested levels of objects, multi-level dependencies and up level/down level dependencies, wherein the categorizing includes creating a graph for each category to depict the relationships and dependency between the nested levels of objects;

formalizing the relationships of the dependencies based upon the graph wherein the graph depicts the relationship of each category of the categorizing step by deriving a dependency table from the graph of each category, wherein the dependency table describes the relationship of each object to the at least one base object, the dependency table having at least an entry for every object-to-object relationship, including a category of relationship, and nesting-level of the dependency from a base-table; and determining a guaranteed order of recreating the objects based upon the built dependency table, wherein all objects related to the built dependency table are automatically recreated without requiring the objects to exist before the built dependency table is derived, wherein the guaranteed order of recreating the objects ensures management of the dependencies wherein when duplicate entries exist for the objects, the next highest nesting-level takes precedence.

2. The method of claim 1 wherein the at least one base object comprises a table within the database.

3. The method of claim 1 wherein the dependencies are categorized in the following manner:

providing Category A dependencies, wherein Category A dependencies are a down-level dependencies from the at least one base-object;

providing Category B dependencies, wherein Category B dependencies are an up-level dependencies from the at least one base-object; and providing Category C dependencies, wherein Category C dependencies are a down-level dependencies from a Category B object.

4. The method of claim 3 in which the categorizing step includes the step of enumerating a nest level of recursion of the dependency from at least one base object.

5. The method of claim 4 wherein the order of recreating objects step comprises:

recreating Category A objects first, from a highest nestlevel to a lowest, by referencing the at least one base object;

recreating Category C objects next, from a highest nestlevel to a lowest, by referencing the at least one base object, avoiding those objects which are already included in the Category A objects recreation; and recreating Category B objects last, from a lowest nestlevel to a highest, by referencing the at least one base object and avoiding those objects which are already included in the Category A object and the Category C object recreations.

6. The method of claim 4 wherein the formalizing step comprises building a Dependency Management Table which is derived from the categorizing and enumerating steps.

7. A computer readable storage medium containing program instructions executable on a computer for recreating a plurality of database dependencies of objects from one database to another, wherein the computer performs the following functions:

categorizing the dependencies based upon at least one base object, wherein the dependencies include all dependency classes of direct dependencies and nested dependencies, wherein a nested dependency describes a relationship between nested levels of objects, multi-level dependencies and up level/down level dependencies, wherein the categorizing includes creating a graph for each category to depict the relationships and dependency between the nested levels of objects;

formalizing the relationships of the dependencies based upon the graph of each category of the categorizing step by deriving a dependency table from the graph of each category wherein the dependency table describes the relationship of each object to the at least one base object, the dependency table having at least an entry for every object-to-object relationship, including a category of relationship, and nesting-level of the dependency from a base-table; and determining a guaranteed order of recreating the objects based upon the built dependency table, wherein all objects related to the built dependency table are automatically recreated without requiring the objects to exist before the built dependency table is derived, wherein the guaranteed order of recreating the objects ensures management of the dependencies, wherein duplicate entries exist for the objects, the next highest nesting-level takes precedence.

8. The computer readable storage medium of claim 7 wherein the at least one base object comprises a table within the database.

9. The computer readable storage medium of claim 7 wherein the dependencies are categorized in the following manner:

providing Category A dependencies, wherein Category A dependencies are a down-level dependencies from the at least one base-object;

providing Category B dependencies, wherein Category B dependencies are an up-level dependencies from the at least one base-object; and providing Category C dependencies, wherein Category C dependencies are a down-level dependencies from a Category B object.

10. The computer readable storage medium of claim 9 wherein the categorizing step includes the step of enumerating a nest level of recursion of the dependency from the at least one base object.

11. The computer readable program-product storage medium of claim 10 wherein the order of recreating objects step comprises:

recreating Category A objects first, from a highest nestlevel to a lowest, by referencing the at least one base object;

recreating Category C objects next, from a highest nestlevel to a lowest, by referencing the at least one base object, avoiding those objects which are already included in the Category A objects recreation; and recreating Category B objects last, from a lowest nestlevel to a highest, by referencing the at least one base object and avoiding those objects which are already included in the Category A object and the Category C object recreations.

12. The computer readable storage medium of claim 10 wherein the formalizing step comprises building a Dependency Management Table which is derived from the categorizing and enumerating steps.

13. A computer system comprising:

a processing system;

a storage medium and a relational database management system stored within the storage medium and executable on the processing system, the relational database management data system including a relational database system; the relational database system including at least two databases; and mechanisms for recreating a plurality of database dependencies of objects between the at least two databases; the mechanisms comprising categorizing the dependencies based upon at least one base object wherein dependencies include all dependency classes of direct dependences and nested dependencies, multi-level dependencies and up level/down level dependencies, wherein the categorizing includes creating a graph for each category to depict the relationships and dependency between the nested levels of objects;

formalizing the relationships of the dependencies based upon the graph of each category of the categorizing step by deriving a dependency table from the graph of each category wherein the dependency table describes the relationship of each object to the at least one base object, the dependency table having at least an entry for every object-to-object relationship, including a category of relationship, and nesting-level of the dependency from a base-table; and determining a guaranteed order of recreating the objects based upon the built dependency table, wherein all objects related to the built dependency table are automatically recreated without requiring the objects to exist before the built dependency table is derived, wherein the guaranteed order of recreating the objects ensures management of the dependencies, wherein when duplicate entries exist for the objects, the next highest nesting-level takes precedence.

14. The computer system of claim 13 wherein the at least one base object comprises a table within the database.

15. The computer system of claim 13 wherein the dependencies are categorized in the following manner:

providing Category A dependencies, wherein Category A dependencies are a down-level dependencies from the at least one base-object;

providing Category B dependencies, wherein Category B dependencies are an up-level dependencies from the at least one base-object; and providing Category C dependencies, wherein Category C dependencies are a down-level dependencies from a Category B object.

16. The computer system of claim 15 in which the categorizing mechanism includes the step of enumerating a nest level of recursion of the dependency from the at least one base object.

17. The computer system of claim 16 wherein the order of recreating objects mechanism comprises:
- recreating Category A objects first, from a highest nestlevel to a lowest, by referencing the at least one base object;
- recreating Category C objects next, from a highest nestlevel to a lowest, by referencing the at least one base object, avoiding those objects which are already included in the Category A objects recreation; and
- recreating Category B objects last, from a lowest nestlevel to a highest, by referencing the at least one base object and avoiding those objects which are already included in the Category A object and the Category C object recreations.

18. The computer system of claim 16 wherein the formalizing step comprises building a Dependency Management Table which is derived from the categorizing and enumerating mechanisms.

* * * * *